United States Patent [19]
Rodia et al.

[11] 3,890,383
[45] June 17, 1975

[54] 2-HYDROXY-3,4,5-TRICHLOROBENZENESULFONAMIDES

[75] Inventors: Ralph M. Rodia; R. Garth Pews, both of Midland, Mich.

[73] Assignee: The Dow Chemical Company, Midland, Mich.

[22] Filed: May 18, 1973

[21] Appl. No.: 361,746

Related U.S. Application Data

[62] Division of Ser. No. 77,703, Oct. 2, 1970, Pat. No. 3,803,062.

[52] U.S. Cl. .......................................... 260/556 AR
[51] Int. Cl. .......................................... C07c 143/78
[58] Field of Search .............................. 260/556 AR

[56] References Cited
UNITED STATES PATENTS

| | | | |
|---|---|---|---|
| 1,962,276 | 6/1934 | Huismann et al. | 260/556 A |
| 3,574,739 | 4/1971 | Wei et al. | 260/556 A |
| 3,577,453 | 5/1971 | Rohr et al. | 260/471 C |
| 3,609,177 | 9/1971 | Traber et al. | 260/471 C |

FOREIGN PATENTS OR APPLICATIONS

| | | | |
|---|---|---|---|
| 733,514 | 2/1943 | Germany | 260/556 A |

OTHER PUBLICATIONS

Farrar, Chem. Abst., 55:1498b, (1960).
Raffa, Chem. Abst. 50:15448a, (1956).
Furdik et al., Chem. Abst. 58:5053b(1963).
May & Baker, Ltd. Chem. Abst., 58:12,710b (1963).
Sehring, Chem. Abst. 77:151,672m (1972).

*Primary Examiner*—Lorraine A. Weinberger
*Assistant Examiner*—Michael Shippen
*Attorney, Agent, or Firm*—Edward E. Schilling; Gary D. Street

[57] ABSTRACT

Novel carbamate esters of 2-hydroxy-3,4,5-trichlorobenzenesulfonamides are prepared by the reaction of a 2-hydroxy-3,4,5-trichlorobenzenesulfonamide compound with a substituted isocyanate compound in the presence of an inert carrier as a reaction medium at a temperature of from about 0° to about 100° C. for a period of about 1 to about 5 hours. The novel compounds are suitable for use as herbicides and fungicides.

1 Claim, No Drawings

2-HYDROXY-3,4,5-TRICHLOROBENESULFONAMIDES

This is a division of application Ser. No. 77,703 filed Oct. 2, 1970, now U.S. Pat. No. 3,803,062.

SUMMARY OF THE INVENTION

The present invention is directed to novel carbamate esters of 2-hydroxy-3,4,5-trichlorobenzenesulfonamides, to novel intermediates, and to methods for their preparation. The novel compounds of the present invention are represented by the following structural formula:

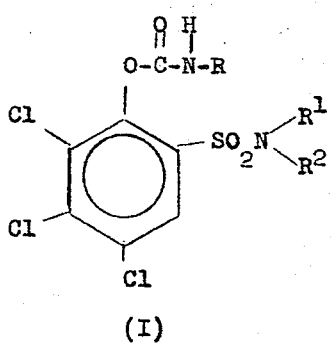

(I)

wherein, in the above and succeeding formulas,

R is a member of the group consisting of loweralkyl, cycloalkyl, alkylene, naphthalene, phenyl and halophenyl;

$R^1$ and $R^2$ are members of the group consisting of hydrogen, cyclohexane, and loweralkyl of from one to about 4, both inclusive, carbon atoms, with the proviso that when either of $R^1$ or $R^2$ is cyclohexane, the other of $R^1$ or $R^2$ is hydrogen or lower alkyl.

As used herein, the term "loweralkyl" means saturated, monovalent aliphatic-radicals, including straight and branched-chain radicals of from one to about 6 carbon atoms, as illustrated by, but not limited to, methyl, ethyl, propyl, isopropyl, butyl, sec.-butyl, amyl, hexyl, and the like.

As used herein, the term "cycloalkyl" means cyclic, saturated aliphatic-radicals of from three to eight carbon atoms, as illustrated by, but not limited to, cyclopropyl, cyclobutyl, 2-methylcyclobutyl, cyclohexyl, 4-methylcyclohexyl, cyclooctyl, and the like.

The term "alkylene" as employed in the present specification and claims refers to straight-chain divalent radicals as well as to branched-chain divalent radicals of from 2 to about 6 carbon atoms, as illustrated by, but not limited to, ethylene, propene, butene, 2-butene, pentene 2-pentene, trimethylethylene, hexene, 2-hexene, tetramethylethylene, and the like.

The term 'halophenyl' as used in the present specification refers to phenyl groups substituted with from 1 to 3 substituents. Suitable substituents include bromine, chlorine and fluorine.

The compounds of the present invention are crystalline solids and are of low solubility in water and of varying degrees of solubility in many common organic solvents. The novel compounds are suitable for use as herbicides and fungicides and are especially adapted to be employed as active toxicants in herbicidal and fungicidal compositions.

The compounds of the present invention corresponding to Formula I are prepared by a novel process wherein a 2-hydroxy-3,4,5-trichlorobenzenesulfonamide reactant of Formula II (hereinafter referred to as the benzenesulfonamide reactant), is reacted with a substituted isocyanate compound according to the following reaction sequence:

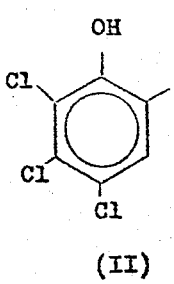 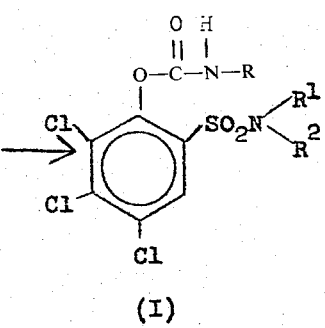

(II)  (I)

wherein R, $R^1$ and $R^2$ are as previously defined.

The reaction of the benzenesulfonamide and isocyanate reactants is conveniently carried out in the presence of an inert carrier as a reaction medium. Representative inert carriers which can be employed as reaction media include carbon tetrachloride, chloroform, benzene, methylenechloride, acetonitrile, and the like. In order to decrease reaction time, a small amount of an actuating agent, e.g., triethylamine, pyridine and the like, can be incorporated into the reaction mixture. In the present invention, the use of such actuating agents is preferred. The reaction proceeds readily at temperatures between 0° and 100° C.; generally, the reaction mixture can be heated at the boiling temperature under reflux. The pressure is not critical and is usually maintained at ambient atmospheric pressure.

In carrying out the reaction, the reactants are contacted with one another in a reaction medium as described. Typically, the benzenesulfonamide reactant and actuating agent are dispersed in a liquid reaction medium and the isocyanate reactant is added dropwise thereto. The resulting reaction mass is generally maintained at the boiling temperature under reflux for a sufficient period of time to allow substantial completion of the reaction, usually from about 1 to about 5 hours. Following the substantial completion of the reaction, the reaction mass is cooled, diluted with a suitable organic solvent, such as one of those hereinbefore mentioned, and evaporated to dryness under reduced pressure. The residue representing the desired product can be further purified by utilizing conventional techniques which include washing with a liquid which is a solvent for impurities but not for the product, recrystallization, and the like.

In a further embodiment of the present invention, the compounds of Formula II are prepared by dissolving a 2,3,4,5-tetrachlorobenzenesulfonamide compound in a liquid reaction medium, such as, for example, any of those mentioned hereinbefore. The mixture is heated and maintained at its boiling temperature under reflux and a solution of potassium hydroxide in water is added dropwise. The resulting reaction mixture is maintained at reflux temperature for a period of from about 6 to about 18 hours in order to substantially complete the reaction. Following the completion of the reaction, the reaction mixture is cooled and acidified with an appropriate acid, such as concentrated hydrochloric, to a pH of about 1.0, and the resulting product precipitate formed upon acidification of the reaction mixture is removed by filtration. The product thus obtained can be further purified by using conventional techniques as described above.

DESCRIPTION OF THE PREFERRED EMBODIMENTS

The following examples illustrate the invention but are not to be construed as limiting the same.

EXAMPLE 1

N,N-diethyl-2-hydroxy-3,4,5-trichlorobenzenesulfonamide (5.0 grams, 0.015 mole) was dissolved in 25 milliliters of chloroform containing 2 to 3 drops of triethylamine and the resulting mixture was heated at the boiling temperature under reflux. Allyl isocyanate (3.0 grams; 0.036 mole) was added dropwise to the refluxing mixture over a period of from about 3 to about 10 minutes and the resulting reaction mixture was maintained at the boiling temperature under reflux for a period of about 1½ hours. Following the completion of the reaction, the reaction mixture was cooled and diluted with methylenechloride. Removal of the solvent present in the reaction mixture was accomplished by evaporation under reduced pressure, and the residue thus obtained was recrystallized from a hexane-methylene chloride solution. As a result of these operations, the desired 2,3,4-trichloro-6-(diethylsulfamoyl)-phenyl allylcarbamate product was obtained as a crystalline solid melting at 121°–127° C. Elemental analysis calculated for $C_{14}H_{17}N_2Cl_3O_4S$ (percent): C, 40.5; H, 4.1; N, 6.9; Cl, 25.6; S, 7.7. Found (percent): C, 40.7; H, 4.1; N, 6.7; Cl, 26.0; S, 7.8.

Other representative products of the present invention are prepared according to the procedure of Example 1 above, using the respective corresponding benzenesulfonamide and isocyanate reactants. These other representative products are identified in the following table I wherein R, $R^1$ and $R^2$ have the same significance as set forth hereinbefore;

MP is melting point; and

MW is molecular weight.

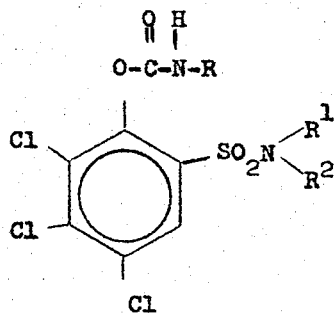

| Ex. No. | Identity of Compound | | | Characterizing Property |
|---|---|---|---|---|
| | R | $R^1$ | $R^2$ | |
| 2 | ⟨phenyl-H⟩ | —$C_2H_5$ | —$C_2H_5$ | MP 109–116°C. |
| 3 | ⟨phenyl-Cl (ortho)⟩ | —$C_2H_5$ | —$C_2H_5$ | MP 161–170°C. |
| 4 | ⟨phenyl-2,4-Cl_2⟩ | —$C_2H_5$ | —$C_2H_5$ | MP 164–172°C. |
| 5 | ⟨naphthyl⟩ | —$C_2H_5$ | —$C_2H_5$ | MP 139–149°C. |

|  | Identity of Compound | | | Characterizing Property |
|---|---|---|---|---|
| Ex. No. | R | R¹ | R² | |
| 6 | —CH₃ | —C₂H₅ | —C₂H₅ | MW 389.5 |
| 7 | phenyl | —C₂H₅ | —C₂H₅ | MP 149–157°C. |
| 8 | —C₄H₉ | —H | —C₄H₉ | MW 431.5 |
| 9 | —C₆H₁₃ | —C₃H₇ | —C₃H₇ | MW 487.5 |
| 10 | —C₅H₁₁ | cyclohexyl | —H | MW 471.5 |
| 11 | —C₃H₇ | cyclohexyl | —C₂H₅ | MW 471.5 |
| 12 | —C₄H₉ | —H | —H | MW 375.5 |
| 13 | cyclohexyl | —H | cyclohexyl | MW 483.5 |
| 14 | cycloheptyl | —C₃H₇ | —C₃H₇ | MW 513.5 |
| 15 | cyclobutyl | —C₄H₉ | —H | MW 429.5 |
| 16 | cyclobutyl | —C₂H₅ | cyclohexyl | MW 483.5 |
| 17 | —CH₂CH₂CH=CH₂ | —C₄H₉ | —C₄H₉ | MW 485.5 |
| 18 | —CH₂(CH₂)₃CH=CH₂ | —H | —C₃H₇ | MW 443.5 |
| 19 | —CH₂(CH₂)₂CH=CH₂ | —H | cyclohexyl | MW 469.5 |
| 20 | —CH₂CH=CHCH₃ | —H | —H | MW 373.5 |
| 21 | —CH₂(CH₂)₂CH=CH₂ | —CH₃ | —C₃H₇ | MW 443.5 |
| 22 | naphthyl | —H | —C₃H₇ | MW 487.5 |
| 23 | do. | —H | cyclohexyl | MW 527.5 |
| 24 | do. | —H | —H | MW 445.5 |
| 25 | 3,5-dibromophenyl | —C₃H₇ | —C₃H₇ | MW 637.5 |

—Continued

| Ex. No. | R | R¹ | R² | Characterizing Property |
|---|---|---|---|---|
| 26 | 2,4,6-trichlorophenyl | $-C_2H_5$ | $-C_2H_5$ | MW 555 |
| 27 | 2,4,6-tribromophenyl | —H | —H | MW 632.5 |
| 28 | 2,4-dibromophenyl | —H | cyclohexyl | MW 635.5 |
| 29 | 2,4-dichlorophenyl | $-C_2H_5$ | cyclohexyl | MW 574.5 |

EXAMPLE 30

N,N-diethyl-2,3,4,5-tetrachlorobenzenesulfonamide (5.0 grams) was dissolved in 30 milliliters of methanol and heated at the boiling temperature under reflux. To this refluxing mixture was added, by dropwise addition over a period of about 3 to 10 minutes, a solution of potassium hydroxide (15.0 grams) in 30 milliliters of water. The resulting reaction mixture was maintained at the boiling temperature under reflux for a period of from about 8 to about 14 hours. Following the completion of the reaction, the reaction mixture was cooled and acidified to a pH of 1.0 with concentrated hydrochloric acid. The solid product formed upon acidification was filtered off and recrystallized from an ether-hexane mixture. As a result of these operations, there was obtained the desired N,N-diethyl-2-hydroxy-3,4,5-trichlorobenzenesulfonamide compound melting at 144°-147° C. Elemental analysis calculated for (percent): $C_{10}H_{12}Cl_3SO_3N$: C, 36.5; H, 3.69; N, 4.23; Cl, 31.6; S, 9.9. Found (percent): C, 36.5; H, 3.74; N, 4.26; Cl, 31.5; S, 10.1.

In a manner similar to that described in Example 30, there are obtained, inter alia, the following 2-hydroxybenzenesulfonamide compounds upon the reaction of the respective corresponding 2,3,4,5-tetrachlorobenzenesulfonamide compound with potassium hydroxide:

N-butyl-2-hydroxy-3,4,5-trichlorobenzenesulfonamide, having a molecular weight of 331.5;

N,N-di-propyl-2-hydroxy-3,4,5-trichlorobenzenesulfonamide, having a molecular weight of 360.5;

N-cyclohexyl-2-hydroxy-3,4,5-trichlorobenzenesulfonamide, having a molecular weight of 357.5;

N-cyclohexyl-N-ethyl-2-hydroxy-3,4,5-trichlorobenzenesulfonamide, having a molecular weight of 386.5;

N,N-dibutyl-2-hydroxy-3,4,5-trichlorobenzenesulfonamide, having a molecular weight of 388.5;

N-propyl-2-hydroxy-3,4,5-trichlorobenzenesulfonamide, having a molecular weight of 317.5;

N-methyl-N-propyl-2-hydroxy-3,4,5-trichlorobenzenesulfonamide, having a molecular weight of 332.5; and 2-hydroxy-3,4,5-trichlorobenzenesulfonamide, having a molecular weight of 276.5.

The compounds of the present invention are suitable for use as herbicides and fungicides. This is not to suggest, however, that the compounds claimed and compositions containing them are equally effective at similar concentrations or against the same plant or fungal pests. For such uses, the unmodified substance can be utilized. However, the present invention also embraces the use of compounds in a formulation. Thus, for example, a compound can be dispersed on a finely divided solid and employed therein as a dust. Also, the compounds, or a solid composition comprising the compound, can be dispersed in water, typically with the aid of a wetting agent, and the resulting aqueous suspension employed as a spray. In other procedures, the compound can be employed as a constituent of organic liquid compositions, oil-in-water and water-in-oil emulsions, or water dispersions, with or without the addition of wetting, dispersing, or emulsifying agents.

The exact concentration of the toxic constituent to be employed in the treating compositions is not critical and may vary considerably provided the plant or fungal pests and/or their habitats are contacted with an effective amount of the toxicant. Good results are obtained when compositions containing controlling and fungicidal concentrations, usually from about 500 to 10,000 parts per million by weight of one or more of the compounds, are employed. The concentration of toxicants in liquid compositions generally is from about 1.0 to about 50 percent by weight. Concentrations up to 95 weight percent are often employed. In dusts, the concentration of the toxicant can be from about 1.0 to 10 weight percent; however, concentrations up to 95 weight percent are often conveniently employed. In compositions to be employed as concentrates, the toxicant can be present in a concentration of from 5 to 98 weight percent.

In representative operations, numerous compositions containing 500 parts of one of the compounds of the present invention as sole toxicant per million parts by weight of ultimate treating composition were prepared and separately applied to the environments containing and supporting thriving members of one of a variety of fungal organisms. The results of the evaluations of the compounds tested at the above concentration and the percent control of the organisms treated are set forth in the following table II:

TABLE II

| Cmpd. No. | IDENTITY OF COMPOUND | PERCENT CONTROL AND KILL OF: | | | |
|---|---|---|---|---|---|
| | | *B.s. | *S.a. | *T.m. | *M.p. |
| 1 | 2,3,4-trichloro-6-(diethylsulfamoyl)phenyl methylcarbamate | 100 | 50 | 0 | 100 |
| 2 | 2,3,4-trichloro-6-(diethylsulfamoyl)phenyl allylcarbamate | 100 | 100 | 0 | 50 |
| 3 | 2,3,4-trichloro-6-(diethylsulfamoyl)phenyl m-chlorocarbanilate | 100 | 100 | 100 | 100 |
| 4 | 2,3,4-trichloro-6-(diethylsulfamoyl)phenyl α-Naphthalenecarbamate | 100 | 50 | 0 | 100 |
| 5 | 2,3,4-trichloro-6-(diethylsulfamoyl)phenyl carbanilate | 100 | 100 | 100 | 100 |
| 6 | 2,3,4-trichloro-6-(diethylsulfamoyl)phenyl 3,4-dichlorocarbanilate | 100 | 100 | 100 | 100 |
| 7 | 2,3,4-trichloro-6-(diethylsulfamoyl)phenyl cyclohexylcarbamate | 100 | 50 | 0 | 100 |

*B.s. - Bacillus subtilis
*S.a. - Staphylococcus aureus
*T.m. - Trichophyton mentagrophytes
*M.p. - Mycobacterium phlei In further representative operations, each of the 2,3,4-trichloro-6-(diethylsulfamoyl)phenyl methylcarbamate, 2,3,4-trichloro-6-(diethylsulfamoyl)phenyl allylcarbamate, 2,3,4-trichloro-6-(diethylsulfamoyl)phenyl m-chlorocarbanilate, 2,3,4-trichloro-6-(diethylsulfamoyl)phenyl α-naphthalenecarbamate, and 2,3,4-trichloro-6-(diethylsulfamoyl)phenyl cyclohexanecarbamate compounds gives complete control and kill of cotton when one of the named compounds is separately applied to cotton plants at a concentration of 4.0 parts per million by weight.

In additional operations, each of the 2,3,4-trichloro-6-(diethylsulfamoyl)phenyl 3,4-dichlorocarbanilate, 2,3,4-trichloro-6-(diethylsulfamoyl)phenyl methylcarbamate, 2,3,4-trichloro-6-(diethylsulfamoyl)phenyl carbanilate, 2,3,4-trichloro-6-(diethylsulfamoyl)phenyl allylcarbamate and 2,3,4-trichloro-6-(diethylsulfamoyl)phenyl cyclohexanecarbamate compounds gives substantially complete control of pigweeds when such plant pests are contacted with one of the above named compounds at a dosage of 20 pounds per acre.

The 2,3,4,5-tetrachlorobenzenesulfonamide compounds and the substituted isocyanates of the type employed as starting materials in the present invention can be prepared by known or analogous conventional methods or readily obtained from commercial sources.

We claim:
1. The compound which is N,N-diethyl-2-hydroxy-3,4,5-trichlorobenzenesulfonamide.

* * * * *